United States Patent
Peucat et al.

(10) Patent No.: US 9,606,023 B2
(45) Date of Patent: *Mar. 28, 2017

(54) METHOD FOR MONITORING AN SCR SYSTEM

(75) Inventors: Frederic Peucat, Brussels (BE); Jean-Claude Habumuremyi, Haaltert (BE); Joel Op De Beeck, Lint (BE)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 971 days.

This patent is subject to a terminal disclaimer.

(21) Appl. No.: 13/806,407

(22) PCT Filed: Jun. 22, 2011

(86) PCT No.: PCT/EP2011/060450
§ 371 (c)(1),
(2), (4) Date: Jun. 17, 2013

(87) PCT Pub. No.: WO2011/161162
PCT Pub. Date: Dec. 29, 2011

(65) Prior Publication Data
US 2013/0269418 A1   Oct. 17, 2013

(30) Foreign Application Priority Data

Jun. 23, 2010 (FR) .................... 10 54985
Dec. 3, 2010 (FR) .................... 10 60088

(51) Int. Cl.
*G01M 15/04* (2006.01)
*F01N 3/20* (2006.01)
*F01N 11/00* (2006.01)

(52) U.S. Cl.
CPC ............ *G01M 15/04* (2013.01); *F01N 3/208* (2013.01); *F01N 11/002* (2013.01);
(Continued)

(58) Field of Classification Search
CPC .......... F01N 11/002; F01N 2610/1433; F01N 2610/144; F01N 2610/146;
(Continued)

(56) References Cited

U.S. PATENT DOCUMENTS 5,237,975 A * 8/1993 Betki ................ F02D 41/3082
123/456
5,711,483 A * 1/1998 Hays ................ G05D 16/2066
222/63

(Continued)

FOREIGN PATENT DOCUMENTS

DE    10 2008 043 469        5/2010

OTHER PUBLICATIONS

International Search Report Issued Aug. 31, 2011 in PCT/EP11/60450 Filed Jun. 22, 2011.

(Continued)

*Primary Examiner* — John Fitzgerald
(74) *Attorney, Agent, or Firm* — Oblon, McClelland, Maier & Neustadt, L.L.P.

(57) ABSTRACT

A method for detecting whether an injector with a valve controlled by a PWM signal of an SCR system is at least partially clogged, the system including a pump, or a positive-displacement pump, driven by a motor and pressure of which is controlled by a controller that continuously measures the pressure and/or another parameter characteristic of energy transmitted by the motor to the pump. According to the method, during normal operation of the SCR system, specific portions of one of the measurements are compared with equivalent portions stored in a memory.

11 Claims, 5 Drawing Sheets

(52) U.S. Cl.
CPC .. *F01N 2610/144* (2013.01); *F01N 2610/146* (2013.01); *F01N 2610/1433* (2013.01); *F01N 2900/0408* (2013.01); *F01N 2900/0412* (2013.01); *F01N 2900/1806* (2013.01); *F01N 2900/1808* (2013.01); *Y02T 10/24* (2013.01); *Y02T 10/47* (2013.01)

(58) Field of Classification Search
CPC ....... F01N 2900/0408; F01N 900/0412; F01N 900/1806; F01N 900/1808; F01N 3/208; G01M 15/04
See application file for complete search history.

(56) References Cited

U.S. PATENT DOCUMENTS

| | | | | |
|---|---|---|---|---|
| 7,185,528 | B2* | 3/2007 | Bristol | F04B 49/20 388/809 |
| 8,104,268 | B2* | 1/2012 | Gerlach | F01N 3/029 60/274 |
| 8,145,408 | B2* | 3/2012 | Karlsson | F01N 3/2066 123/198 A |
| 8,155,860 | B2* | 4/2012 | Franco | F01N 3/0253 701/103 |
| 8,857,160 | B2* | 10/2014 | Haeberer | F01N 3/2066 220/564 |
| 9,222,849 | B2* | 12/2015 | Peucat | F01N 3/2066 |
| 2009/0194604 | A1* | 8/2009 | Smith | B05B 1/304 239/1 |
| 2009/0248361 | A1* | 10/2009 | Franco | F01N 3/0253 702/182 |
| 2010/0114455 | A1* | 5/2010 | Karlsson | F01N 3/2066 701/102 |
| 2011/0232271 | A1* | 9/2011 | Haeberer | F01N 3/2066 60/295 |
| 2013/0180323 | A1* | 7/2013 | Peucat | F01N 3/2066 73/114.75 |

OTHER PUBLICATIONS

Chinese Office Action issued Apr. 29, 2015, in Patent Application No. 201180031115.1 (with English Translation of the Abstract).
Hao Lijun, "Clean Fuel Automobile," Beijing: China Labour and Social Security Publishing House,ISBN 7-5045-3077-8, 2000, p. 34 (with English Translation).
U.S. Appl. No. 13/805,871, filed Dec. 20, 2012, Peucat, et al.

* cited by examiner

METHOD FOR MONITORING AN SCR SYSTEM

The present application relates to a method for monitoring an SCR system. In particular it relates to a method for detecting whether its injector is clogged.

Legislation on vehicle and heavy goods vehicle emissions stipulates, amongst other things, a reduction in the release of nitrogen oxides NO into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of NO produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive solution (generally an aqueous urea solution) and also a device for metering the desired amount of additive and injecting it into the exhaust line. This device is generally an injector and preferably is of "active" type, i.e. it includes the metering function.

U.S. Pat. No. 6,063,350 describes an SCR system that uses an injector controlled by a PWM (Pulse Width Modulation) signal. Such a signal is generally in the form of a square-wave voltage, i.e. a train of rectangular electrical pulses having a given duration and amplitude and transmitted with a given period. These electrical pulses actuate a coil (solenoid) which moves the needle of the injector to its open position. Generally, the duration of the pulses (and therefore the opening time of the injector) is varied in order to vary the flow injected, hence the name of this type of control (PWM). The advantage of only varying the duration and not the frequency of the pulses lies in the fact of having a linear relationship between the opening time and the amount (flow) injected, hence a greater metering precision. There is an alternative to the aforementioned train of rectangular waves, according to which a peak current is first used to open the injector and a holding current is then used throughout the open phase of the injector. Such a type of signal is called PWM with hold. In the remainder of the document, the acronym PWM will very simply be used to denote these two types of signal. Injectors as described above exist with one or more orifices that can be closed off by a common needle valve.

However, the drawback of this type of injector is that the orifice(s) may in the end become clogged. The new Euro-6 standard which will come into effect in 2014 provides that every 30 min, a test must be carried out and that an alarm must be sent if the amount of urea consumed is less than 50% of the amount of urea required by the engine control system for carrying out the pollution control of the exhaust gases.

Hence, some companies active in the development of SCR systems have begun to develop systems that make it possible to carry out such tests.

Thus, for example, applications US 2010/0005871 and US 2010/0071349 describe test methods for an SCR system injector according to which tests, in order to observe whether the injector is clogged, the pump is shut down, the injector is fully opened and it is observed how the pressure changes. These methods are difficult to implement in practice because the opening of the injector must be synchronous with the shutdown of the pump. Moreover, they involve a disruption of the pollution control process since the pump must be shut down in order to make the diagnosis.

Application US 2010/0114455 describes another test method for an SCR system injector which this time is carried out with the pump running. It consists in modifying the condition (control) of the injector, then in observing how a quantity characteristic of its flow rate (the rotational speed of the engine that drives it) changes. In principle, this method could induce a lesser disruption of the pollution control process, but it is not described in sufficient detail in the application in question in order to understand how it would work in practice. Moreover, the application does not provide many details (especially regarding the type of pump in question, regarding the way of carrying out the tests in practice, etc.) or experimental results that make it possible to ensure its effective operation.

The present invention aims to solve these problems by providing a method for monitoring (detecting the condition) of an SCR system injector which is simple and gives good results in practice. It is based on the surprising observation that with an SCR system equipped with an injector of the type described above (the opening of the orifice(s) of which is conditioned by a valve controlled by a PWM signal) and with a pump (preferably a positive-displacement pump) precisely controlled either in speed or in pressure, differences may be observed over the continuous measurements respectively of the pressure or of the speed depending on whether the injector is or is not clogged, especially:

perturbations/fluctuations in pressure or in speed are generally observed if the injector is not clogged, these perturbations/fluctuations being greatly attenuated if the injector is clogged; and for a given pump and under given operating conditions (temperature, speed or pressure especially), the average value of the delta (or difference) in pressure relative to a reference value or of the delta in speed relative to a reference value is also dependent on whether the injector is or is not clogged.

It should be noted that the speed/pressure may be generalized to any other type of parameter reflecting the energy transmitted by the motor to the pump (see below).

Hence, provided that use is made of the pressure or speed measurements (or measurements of another similar parameter) carried out by the monitoring system of the SCR system, it is no longer necessary to shut down or significantly disrupt the metering in order to carry out a test for monitoring the condition of the injector.

For this purpose, the present application relates to a method for detecting whether an injector with a valve controlled by a PWM signal of an SCR system is at least partially clogged, said system comprising a pump driven by a motor and the pressure of which is controlled by a controller that continuously measures the pressure and/or another parameter characteristic of the energy transmitted by the motor to the pump, according to which, during normal operation of the SCR system, specific portions of one of these measurements are compared with equivalent portions stored in a memory.

In particular: the controller compares the profile of the pressure or speed (or other) perturbations/fluctuations and/or the average value of the pressure or of the speed under given conditions with reference profiles and values stored in a memory and deduces the condition (clogged or not) of the injector therefrom.

The injector to which the method according to the invention applies comprises at least an orifice, the opening/closing of which is carried out by a valve controlled by a PWM signal as described above. This is generally an electromagnetic or piezoelectric valve. The invention gives good results with injectors having an electromagnetic valve.

The pump to which the invention applies is a pump, preferably a positive-displacement pump, driven by a motor and the operation of which is generally controlled by a controller. It is preferably a rotary pump and hence generally comprises a stator and a rotor and can preferably operate in two opposite rotational directions, one generally corresponding to supplying the feed line with liquid and the other generally corresponding to a purge of the feed line. Preferably, the pump is a rotary pump and the parameter characteristic of the energy transmitted by the motor to the pump is the rotational speed of the pump. The invention hence gives good results with a gear pump.

Any type of electric motor may be suitable for driving the pump. Preferably, in the case of a rotary pump, the motor is of the BLDC (brushless direct current) motor type. In this case, the pump is driven by a magnetic coupling between the rotor of the pump and a drive shaft of the motor.

The controller of the pump is a control module (generally comprising a PID regulator and a motor speed controller) and an electric power supply unit which preferably supplies the motor with the power required to operate it at the desired speed and which enables its direction of rotation to be reversed, where necessary.

Preferably, according to the invention, the pump is also controlled by a PWM-type signal. Most particularly preferably, an ECM (Electronic Control Module) sends, to the pump controller, a PWM (Pulse Width Modulation) control signal having a duty cycle that varies as a function of the desired operating conditions for the pump and according to which the controller acts on the motor to apply said operating conditions to the pump. This preferred variant is the subject of Application WO 2008/087153 in the name of the Applicant, the subject of which is incorporated by reference in the present application.

As explained previously, the present invention is applied to an SCR system, the purpose of which is to inject a pollution-control liquid into the exhaust gases of an internal combustion engine. Such a system generally comprises at least one tank for storing said liquid and a feed line enabling said liquid to be conveyed to the injector using the pump (placed in this line therefore). One liquid to which the present invention applies particularly well is urea.

The term "urea" is understood to mean any, generally aqueous, solution containing urea. The invention gives good results with eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the Adblue® solution. The latter have the advantage of only freezing from −30° C. onwards (as opposed to −11° C.), but have the disadvantages of corrosion problems linked to the possible release of formic acid and a less available market (whereas urea is widely used and readily available even in fields such as agriculture). The present invention is particularly advantageous in the context of eutectic water/urea solutions.

In one variant of the invention, the pump intentionally meters too great an amount of liquid, the excess of which is returned to the tank, for example using a return (or bypass) line equipped with a calibrated valve or a calibrated orifice. When the urea is injected into the exhaust gases of an engine, this variant makes it possible to cool the pump. Alternatively, the return line may start from the injector and it then makes it possible to cool said injector.

In another variant of the invention, the feed line is purged after each use of the pump (just before it is shut down) in order to reduce the starting time of the system and avoid prematurely damaging the lines (as the urea solutions expand when it freezes). The purge may be carried out, for example, by reversing the rotational direction of the pump just for the time necessary to convey the liquid contained in the feed line back to the tank.

As regards the return line, if present, it generally has a relatively low volume and therefore, if it is heated, it should not be purged while the pump is stopped. Therefore, to prevent the liquid from going round in circles in the loop defined by the feed line and the return line during the purge when this is carried out by reversing the rotational direction of the pump, it is advantageous to equip the return line with a non-return valve.

According to the invention, the diagnosis of the injector is carried out without disrupting the normal operation of the SCR system, i.e. the system constantly responds to a signal (generally transmitted by the onboard computer and/or the engine control unit (or ECU) and/or an electronic module (ECM) specific to the SCR system that has an interface with the ECU) including information relating to the amount of liquid that it is necessary to inject into the exhaust gases for controlling the pollution thereof and it is not necessary to initiate a test sequence which could significantly disrupt this operation.

According to a first variant of the invention, in order to do this, use is made of the continuous measurement of the pressure or of another parameter linked to the energy transmitted by the motor to the pump. Depending on the type of pump and the regulation thereof, this parameter may be the rotational speed (for a rotary pump), the frequency (for a reciprocating pump), the current, the voltage, etc. Generally, in the case of a rotary pump, use is made of the continuous measurement of the pressure or of the speed (depending on whether the pump is speed regulated or pressure regulated respectively), which measurement the controller must in any case carry out as an integral part of the control process (which will be described in greater detail below) and specific portions of this measurement are compared with equivalent portions stored in a memory. Preferably, in order to process the information rapidly, this memory is located in the ECM of the SCR system, which communicates with the ECU as explained above. But it should be noted that this parameter depends on the architecture of the SCR system (which may or may not have a specific ECM).

According to this variant of the invention, the controller measures the noise of the motor control energy, namely: it calculates the difference between the average of the maxima and the average of the minima of the measurement in question (pressure, speed, current, etc.) for operation at a given DC of the PWM control signal of the pump, compares this value with an average value stored previously in the memory (and which is characteristic of a given DC) and deduces the condition of the injector therefrom.

The term "DC" is understood to mean the duty cycle of the PWM signal, which is expressed in practice by the opening ratio (time) of the injector over a given period. Thus, a DC of 0% corresponds to a fully closed injector and a DC of 100% to a fully open injector.

According to a second variant of the invention, the controller measures the average value of the speed (if the pump is pressure regulated) or of the pressure (if the pump is speed regulated) under given operating conditions, also compares this value with an average value stored previously in the memory (and which is characteristic of a given DC) and deduces the condition of the injector therefrom.

In order to be free from the influence of temperature, tolerances linked to the various types of pumps, etc., in a preferred subvariant, the controller firstly measures the average speed (or pressure) at a given DC (for example 0) and for a given setpoint pressure (or speed); next, it measures the variation of average speed (or of average pressure) obtained by opening the injector at a given metering rate, preferably by imposing thereon a PWM signal with a DC of greater than or equal to 15% (50% for example); and finally, it compares this value with an average value stored beforehand in the memory and deduces the condition of the injector therefrom.

This variant therefore clearly involves the initiation of a specific test sequence, but given that it is of short duration (typically of the order of a few seconds for systems working at a frequency of the order of Hz), it does not significantly disrupt the operation of the system in normal mode. Moreover, the computer may ensure that the over-injection carried out during the test sequence is compensated for by adapting (reducing relative to the calculated value) the amount of additive injected in the seconds following the latter so as to ultimately inject the required (calculated) amount over a given period encompassing the test sequence and the period of compensation.

The reference values mentioned above may be the same during the entire service life of the SCR system. Alternatively, they may be recalculated at a given frequency so as to have a reference that adapts to the change (ageing) of the system and that takes into account external perturbations introduced into the system (change in the surrounding temperature, change in altitude, etc.).

In one variant of the invention (that with pressure control), the controller is connected to a pressure sensor and it compares, in a loop, the pressure setpoint value with the value measured by the sensor and consequently acts on the rotational speed of the motor (or another parameter linked to the latter such as the voltage, the current, etc.) in order to attempt to stabilize the pressure at the setpoint value. Preferably, this sensor is located before the return (bypass) line, where necessary.

Generally, this is done using a pressure regulator which carries out the comparison between the setpoint pressure and the pressure measured (or estimated from other operating parameters of the system) and generates an error signal for the motor rotational speed controller.

In this variant, the regulator may be of any known type, but it is preferably of PI(D) (Proportional Integral Derivative type (the latter being optional)).

As regards the pressure sensor, it is preferably integrated with the pump, that is to say that it may be attached to the pump by any known attachment means.

In another variant of the invention (that with speed control), the controller is connected to a speed sensor and/or it estimates (calculates) the speed and it compares, in a loop, the speed setpoint value with the value measured/estimated by the sensor and consequently acts to minimize the difference between the two. This variant is suitable for systems that have a separate pressure regulation, or that make it possible to adapter the opening time of the injector to the actual pressure delivered by the pump.

In a preferred embodiment of the invention, after an "injector clogged" diagnosis has been performed, the result thereof is validated. This can be done easily by checking if the pressure and speed are in the normal range of operation. It is namely so that for instance, in case of loss of fluid, when in pressure regulation mode, the pump speed will increase until saturation (max. speed), which phenomenon can easily be detected. Also, in the first injection cycles after priming the pump, speed peaks can be observed, which should be disregarded because not linked to an "injector clogged" situation but to the fact that air may still be present in the system.

It should be noted that all the variants described above may be used separately or in combination.

The present invention is illustrated, in a non limitative way, by the appended FIGS. 1 to 5.

FIG. 1 depicts an SCR system to which the present invention may be applied;

FIG. 2 gives the result of measurements illustrating the fluctuations and changes in pressure/speed that are at the key of a method according to the first variant of the invention;

Figure 1:
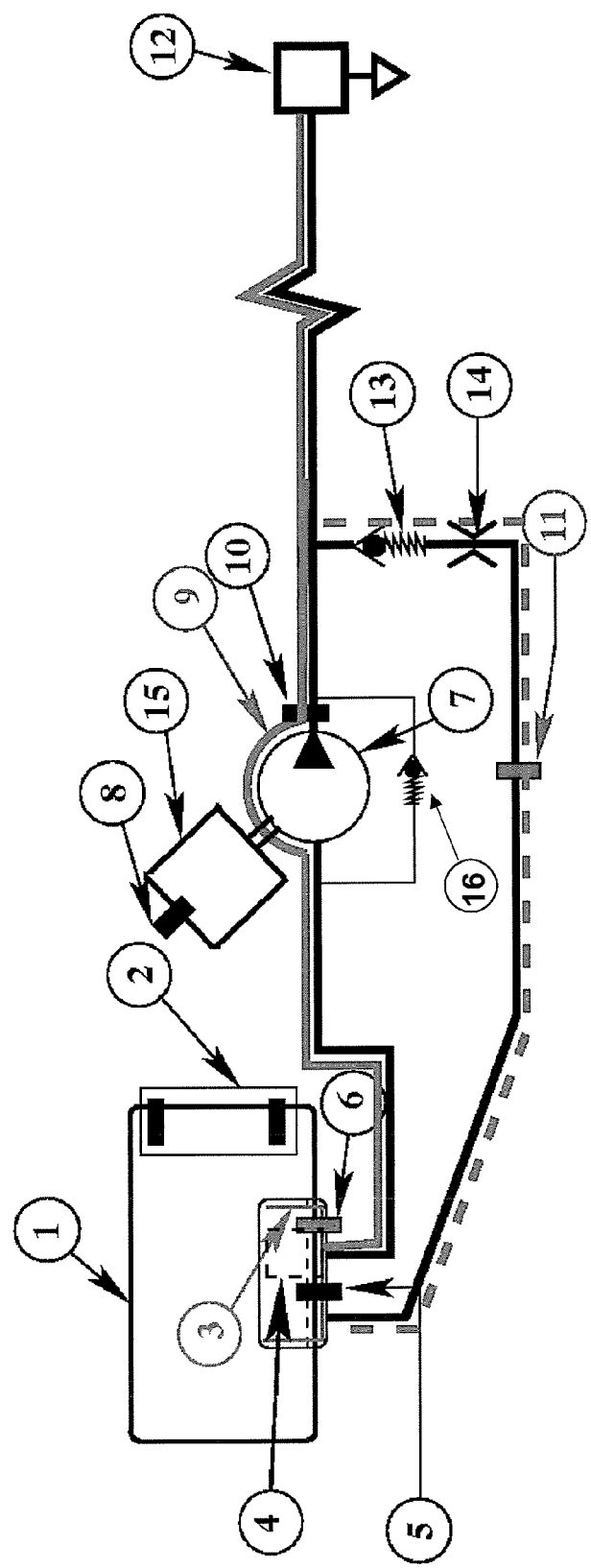
FIG. 1 illustrates an SCR system to which the present invention may be applied and which comprises the following components.

1: urea tank
2: gauge (level sensor)
3: heating element
4: filter
5: temperature sensor
6: current sensor for the heating element
7: pump
8: speed sensor
9: heating filament for the lines and pump heating cartridge
10: pressure sensor
11: current sensor for the line heater
12: injector
13: non-return valve that prevents the liquid from going round in circles (in the loop created by the feed line and that for return to the tank) during the purge (when the pump rotates in reverse)
14: calibrated orifice (restriction)—used to set the flow rate and to add resistance in order to increase the pressure (by increasing pressure drops in the return line)
15: (BLDC) motor for driving the pump
16: non-return valve that enables the pressure at the pump outlet to be regulated.

It is worth noting that with such a system, an additional cause of error in the "injector clogged" diagnosis (than those reported above, namely: fluid loss and priming conditions) exists, owed to the fact that the non-return valve (13) can be blocked and unblocked, which phenomenon again can be detected easily because the pump speed will be below its normal value when the valve is clogged. If this unblocking occurs during a diagnosis, the speed will be higher after said diagnosis than during it, so that again, the phenomenon can be detected. All this again shows the advantage of dynamically measuring the pressure/speed and analysing/comparing the registered data with data stored in a memory, as in the present invention.

Figure 2:
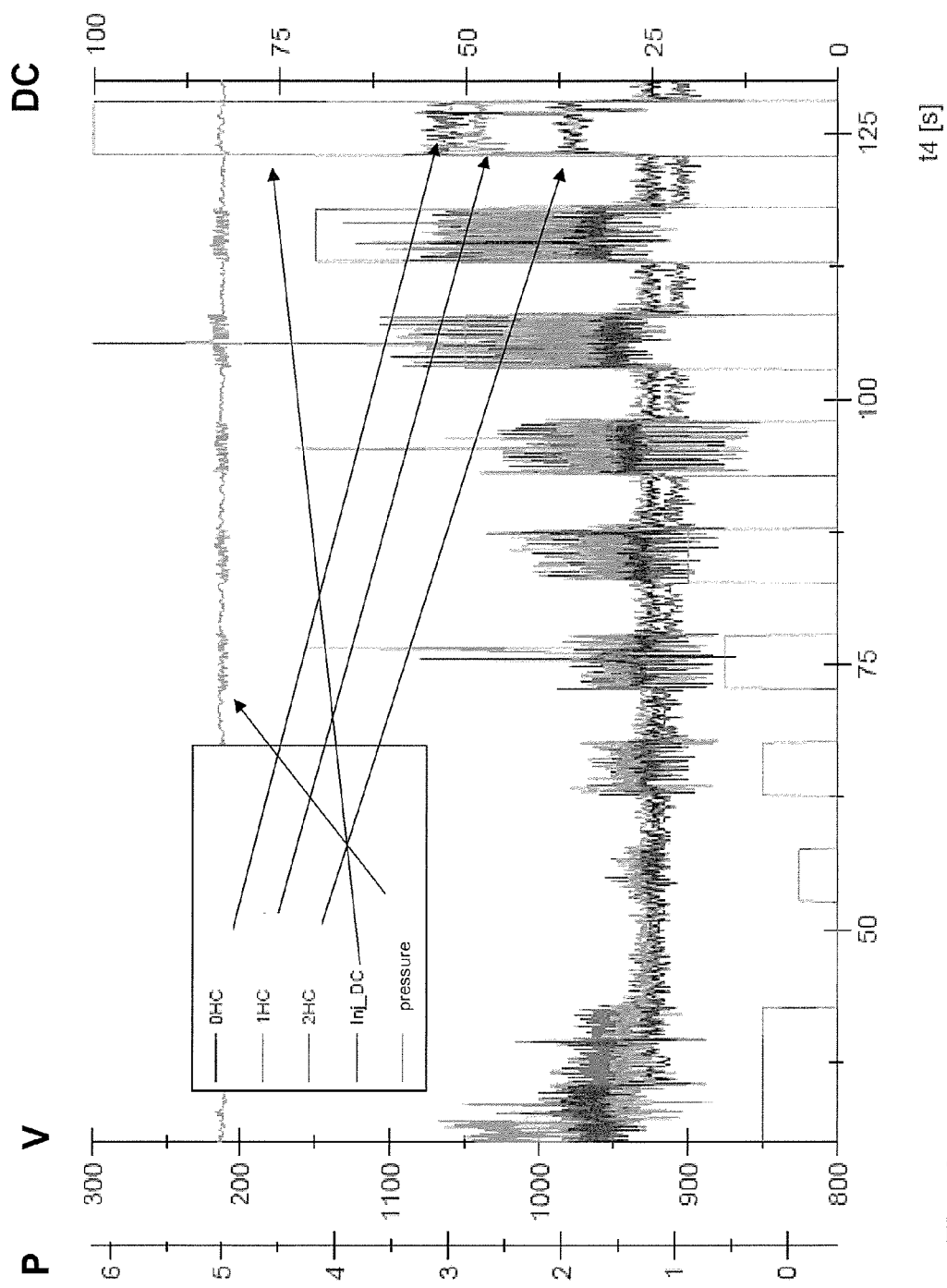

FIG. 2 illustrates the variation in speed associated with progressive openings (increasing duty cycle) of the injector for a constant pressure regulation (at 5 bar). On this graph, shown on the x-axis is the time (in s) and on the y-axis, respectively, are the duty cycle (Injector Duty Cycle (%) or DC, smooth square peaks, the scale for which is on the right of the figure), the pressure or P (jagged top curve, the scale for which (in bar) is on the far left) and the increases in speed or V (jagged peaks, the scale for which (in rpm) is just beside that of the pressure) recorded during a test campaign on a system similar to that illustrated in FIG. 1.

These tests proceeded as follows:
the system was stabilized by regulating the pressure at 5 bar (which was maintained during the sequence of steps below) with a DC of 10%;
the injector was closed and the speed was measured;
the injector was then successively opened at 5, 10, 15, 20, 30, 50, 70 and 100% of DC, this being over the times indicated in FIG. 2 and closing the injector for a given time (also seen in the figure: 5 s) between each different opening test of the injector (for a time of 5 s also and at a frequency of 3.3 Hz).

These tests were carried out with an injector having 3 injection orifices manufactured by BOSCH and designed for an SCR system, respectively being "free" (no orifice clogged, 0 HC or "Zero Holes Clogged"), having 1 orifice clogged (1 HC or "Hole Clogged") and having 2 orifices clogged (2 HC).

The differences highlighted in the preamble of the application between a clogged injector and an open injector can be seen in FIG. 2, namely that it can be seen that, depending on the degree of obstruction of the injector, the speed fluctuations are different.

It is true that for a constant 100% DC (injector kept open), the fluctuations/perturbations are of the same order of magnitude for a clogged injector and for a "free" injector, but such a DC is in fact generally used only in a transient state and not over a long period. And since the absolute levels (average values) of the speed are clearly different in that case, these could be used should such a prolonged operation nevertheless take place.

Figure 3:
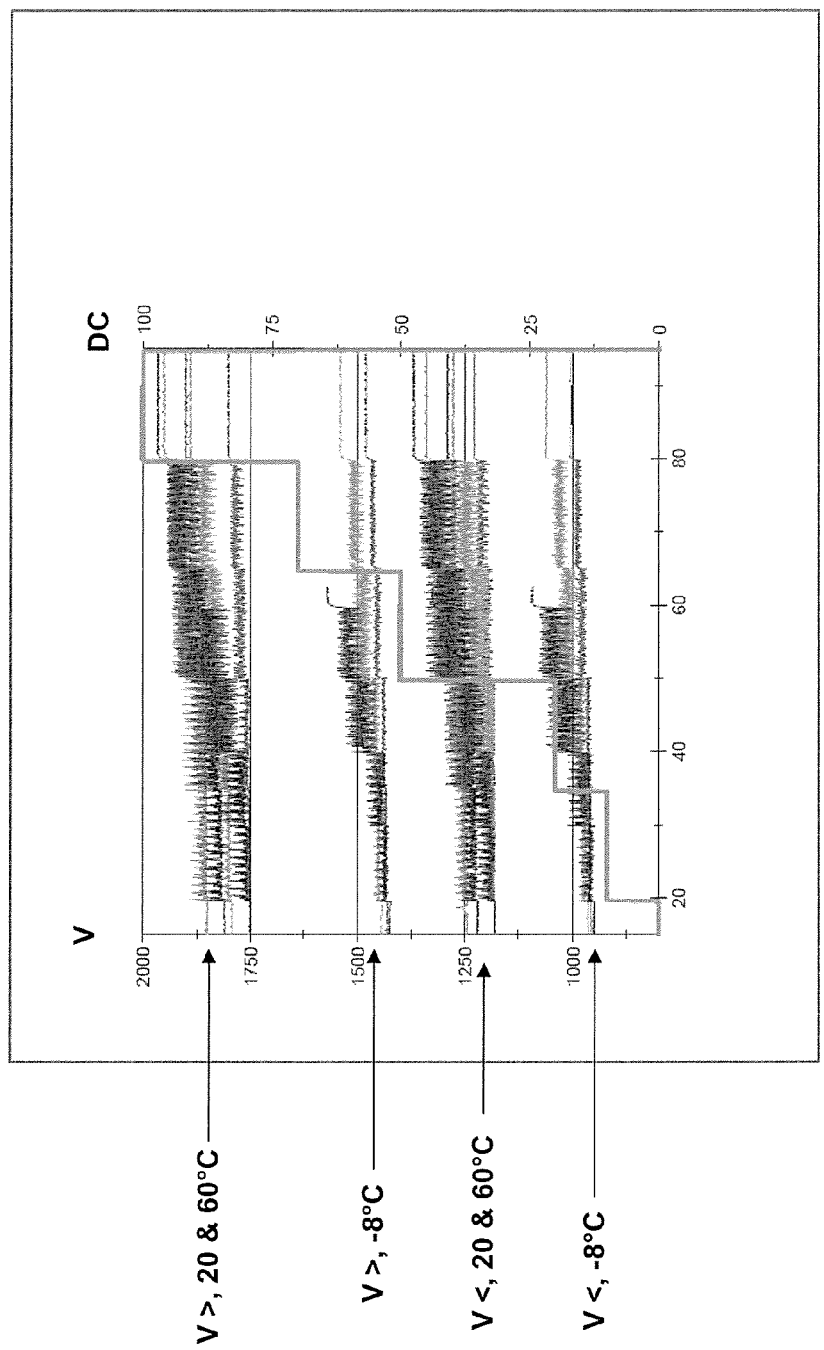
FIGS. 3 to 5 illustrate a method according to the second variant of the invention, namely based on the change in the average speed of the pump when the injector is opened at a given DC.
Figure 4:
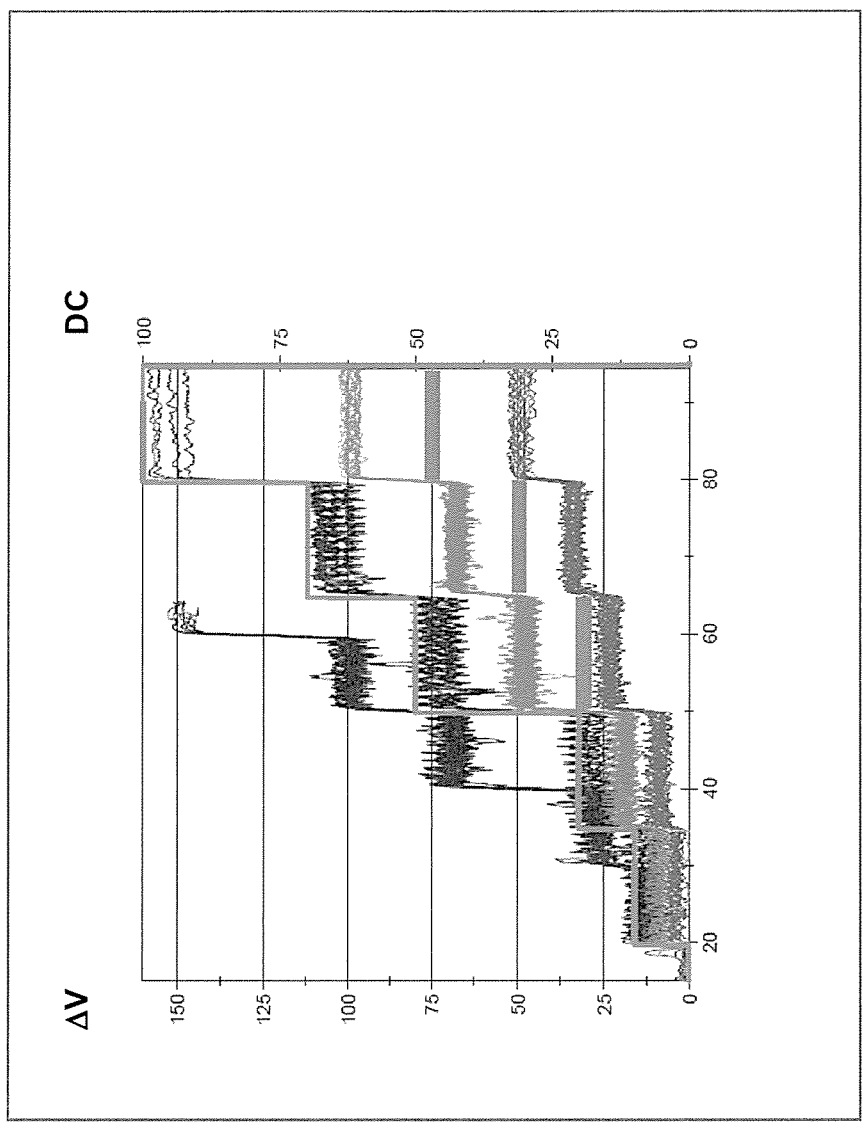
Figure 5:
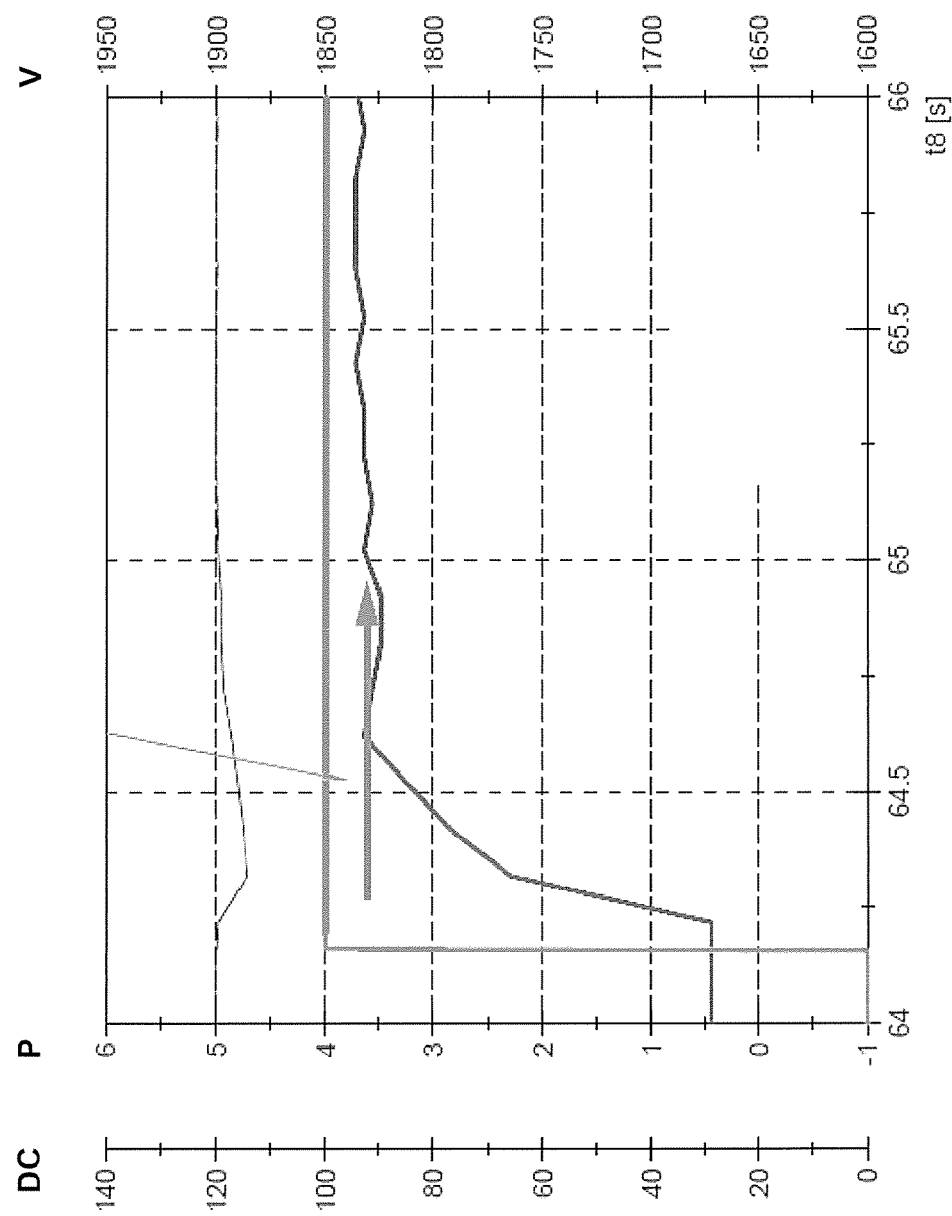

It is precisely on this difference in absolute levels of the speed that the method according to the second variant of the invention is based, which is illustrated in FIGS. 3 to 5 that are based on measurements with an injector of the same type as that described for FIG. 2. The measurement points that appear therein are in fact averages of 7 measurements and these measurements have not been filtered (smoothed). In these figures, the units are identical to those listed below for FIG. 3.

FIG. 3 in fact illustrates the variability of the measurements of the absolute value of the rotational speed as a function of the type of pump and of the temperature. The staircase plot is the change in DC (in %: right-hand scale) as a function of the time (in s (seconds): x-axis). The 3 bottom plots (1$^{st}$ series of measurements) represent the change in the speed of a pump of a first type (low speed) at −8° C. with respectively the 3 orifices of the injector open (upper plot), 1 orifice clogged (intermediate plot) and two orifices clogged (lower plot); and the three plots just above are the equivalent of the preceding plots but respectively at temperatures of 20° C. and 60° C.; and the upper 2 series of plots are the equivalent of the lower 2 series but for a pump at higher speed (therefore each time, with the injector open, with 1 orifice clogged, then 2, at −8° C. for the 1$^{st}$ series and at 20 and 60° C. for the upper series).

It should be noted that for the measurements with the injector open, the variation of DC was different to that illustrated as shown by discontinuities in certain plots (series 1 and 3 starting from the bottom).

This figure is behind the idea of taking a reference measurement (average speed, injector closed (DC=0%) i.e. the speed measured at the start of each plot, as a point of comparison for the change in speed under given conditions, when the injector is opened at a given DC.

The validity of this method was demonstrated with 4 different pumps, for DCs of 10, 20, 50, 70 and 100%, and at 3 different temperatures, as shown in FIG. 4, where it can be seen that by proceeding in this way (i.e. for each pump and each temperature, by measuring the speed with injector closed for a control point at 5 bar, by putting this reference at zero y-axis and by measuring the variation in speed associated with each DC of the staircase curve (right-hand side y-axis)), 36 plots are clearly obtained that are superposed grosso modo in three groups (the one on the far left having to be excluded since it resulted from a change in DC different to that illustrated by the staircase curve, just to confirm the repeatability of the measurement with another profile): the one from the top relating to "injector open" situations, the one from the middle relating to "injector with one orifice clogged" situations and the one from the bottom relating to "injector with two orifices clogged" situations.

FIG. 5 illustrates an actual case of a test sequence (DC on the y-axis on the far left scale, pressure on the y-axis on the neighbouring scale, rotational speed on the y-axis on the right-hand scale and time on the x-axis). As in the other figures, the staircase plot corresponds to the variation of DC. As regards the associated changes in the pressure and in the speed, they appear respectively in the top curve and in the bottom curve. This graph is specific to a system where the control frequency of the injector is 3.3 Hz (and therefore, for which, in practice, it is necessary to wait a maximum of ⅓ s, i.e. 300 ms, to change the DC of the injector) and that of sending information to the controller is 10 Hz (therefore, in practice, 7/10 s, i.e. 700 ms, are required to send the 7 measurements needed for the calculation to the processor integrated into the controller). It can be seen in this graph that, in addition, 500 to 750 ms are required in order for the system to be stabilized.

Hence, for this system, one test sequence that is suitable and that includes sufficient safety margins while being rapid, is the following:
0. stabilization of the system at 5 bar, injector closed
1. calculation of the average speed (average of 7 measurement points), injector closed for one second
2. change in DC sent to the injector and wait until the system is stabilized at the new value, also for one second
3. calculation of the new average speed and of the variation in average speed with respect to the injector closed situation, again for around one second also.

Therefore, it is thus possible to diagnose the injector with a test sequence of 3 s, during which, in the example illustrated, injection was performed at 100% of DC for around 2 s. The computer can therefore, in one preferred operating mode, calculate the amount of additive that was injected in excess relative to the amount required for normal operation, and correct this excess over the following seconds by reducing the amount injected until the (calculated operating) setpoint value is reached over a pre-established period.

The invention claimed is:

1. A method for detecting whether an injector with a valve controlled by a pulse width modulation (PWM) signal of a selective catalytic reduction (SCR) system is at least partially clogged, the system including a pump driven by a motor and pressure of the pump is controlled by a controller that continuously measures the pressure and/or another parameter characteristic of energy transmitted by the motor to the pump, the method comprising:
  during normal operation of the SCR system, comparing specific portions of one of the measurements with equivalent portions stored in a memory; and
  deducing whether the injector is at least partially clogged from the comparing,
  wherein the controller measures an average value of speed, if the pump is pressure regulated, or of the pressure if the pump is speed regulated under given operating conditions, compares this value with an average value stored previously in the memory, and deduces whether the injector is at least partially clogged therefrom, and
  wherein the controller first measures the average value of speed or the pressure with a closed injector and for a given setpoint pressure or speed; next, measures an increase in speed or in pressure obtained by opening the injector at a given metering rate; and then compares this value with an average value stored previously in the memory and deduces whether the injector is at least partially clogged therefrom.

2. The method according to claim 1, wherein the controller compares a profile of perturbations/fluctuations of the pressure or of the parameter characteristic of the energy transmitted by the motor to the pump with reference profiles stored in the memory and deduces whether the injector is at least partially clogged therefrom.

3. The method according to claim 1, wherein the valve of the injector is an electromagnetic valve.

4. The method according to claim 1, wherein an Electronic Control Module (ECM) sends, to the pump controller, the PWM signal having a duty cycle (DC) that varies as a function of desired operating conditions for the pump, and wherein the controller acts on the motor to apply the operating conditions to the pump.

5. The method according to claim 1, wherein the memory is present in an Electronic Control Module (ECM) specific to the SCR system.

6. The method according to claim 1, wherein the values in the memory are recalculated at a given frequency so as to have a reference that adapts to a change or ageing of the system.

7. The method according to claim 1, wherein the pump is pressure controlled, the controller being connected to a pressure sensor integrated into the pump and/or estimating the pressure from other operating parameters of the system.

8. The method according to claim 1, wherein the pump is speed controlled, the controller being connected to a speed sensor and/or estimating a speed from other operating parameters of the system, and wherein the SCR system has a separate independent pressure regulation.

9. The method according to claim 1, wherein the pump is a rotary pump and the parameter characteristic of the energy transmitted by the motor to the pump is a rotational speed of the pump.

10. The method according to claim 9, wherein the pump is a gear pump.

11. A method for detecting whether an injector with a valve controlled by a pulse width modulation (PWM) signal of a selective catalytic reduction (SCR) system is at least partially clogged, the system including a pump driven by a motor and pressure of the pump is controlled by a controller that continuously measures the pressure and/or another parameter characteristic of energy transmitted by the motor to the pump, the method comprising:
  during normal operation of the SCR system, comparing specific portions of one of the measurements with equivalent portions stored in a memory; and
  deducing whether the injector is at least partially clogged from the comparing,
  wherein the pump is speed controlled, the controller being connected to a speed sensor and/or estimating a speed from other operating parameters of the system, and wherein the SCR system has a separate independent pressure regulation.

* * * * *